(12) United States Patent
Vill (10) Patent No.: US 8,230,020 B2
(45) Date of Patent: Jul. 24, 2012

(54) METHOD AND SYSTEM FOR FILTERING ELECTRONIC MESSAGES

(76) Inventor: Jean-Louis Vill, Quebec (CA)

( * ) Notice: Subject to any disclaimer, the term of this patent is extended or adjusted under 35 U.S.C. 154(b) by 876 days.

(21) Appl. No.: 10/994,013

(22) Filed: Nov. 22, 2004

(65) Prior Publication Data

US 2006/0168010 A1 Jul. 27, 2006

(51) Int. Cl.
*G06F 15/16* (2006.01)
(52) U.S. Cl. ...................................................... 709/206
(58) Field of Classification Search .................. 709/206
See application file for complete search history.

(56) References Cited

U.S. PATENT DOCUMENTS

| | | | |
|---|---|---|---|
| 5,930,479 A * | 7/1999 | Hall | 709/238 |
| 5,999,967 A * | 12/1999 | Sundsted | 709/206 |
| 6,266,692 B1 * | 7/2001 | Greenstein | 709/206 |
| 6,484,197 B1 * | 11/2002 | Donohue | 709/206 |
| 7,117,245 B1 * | 10/2006 | Levkoff et al. | 709/206 |
| 7,783,741 B2 * | 8/2010 | Hardt | 709/224 |
| 2006/0026246 A1 * | 2/2006 | Fukuhara et al. | 709/206 |
| 2006/0085505 A1 * | 4/2006 | Gillum et al. | 709/206 |
| 2007/0271346 A1 * | 11/2007 | Vill | 709/206 |

FOREIGN PATENT DOCUMENTS

EP 1122928 A2 * 8/2001

OTHER PUBLICATIONS www.zoemail.com, 45 pages of website printout, printed on Oct. 28, 2004.*
ZoEmail, How ZoEmail Works, ZoEmail vs. Other Anti-Spam Options, ZoEmail Features, publicly available as of Dec. 14, 2003 as evidenced by Internet Archive WayBack Machine, retrieved from http://web.archive.org/web/*/http://www.zoemail.net, pp. 1-12.*
ZoEmail, Lightning QuickStart Guide, ZoEmail User Guide, publicly available as of Jan. 25, 2004 as evidenced by Internet Archive WayBack Machine, retrieved from http://web.archive.org/web/*/http://www.zoemail.com/help.htm, pp. 1-37.*
ZoEmail, Flash Demo, publicly available as of Feb. 27, 2004 as evidenced by Internet Archive WayBack Machine, retrieved from http://web.archive.org/web/*/http://www.zoemail.com/demo.htm, pp. 1-3.*

* cited by examiner

*Primary Examiner* — Faruk Hamza
*Assistant Examiner* — Oleg Survillo (57) ABSTRACT

A method for filtering an incoming electronic message sent by a sender and addressed to a user. The method includes providing a first temporary identifier, receiving the incoming electronic message from the sender, processing the incoming electronic message to detect the presence of the first temporary identifier therein, and upon detection of the first temporary identifier, allowing a delivery of the incoming electronic message to the user.

48 Claims, 3 Drawing Sheets

METHOD AND SYSTEM FOR FILTERING ELECTRONIC MESSAGES

FIELD OF THE INVENTION

The present invention relates to the general field of electronic messaging and is particularly concerned with a method and system for filtering electronic messages.

BACKGROUND OF THE INVENTION

Electronic messaging is an efficient and relatively inexpensive medium of communication. While these two characteristics are mostly advantageous to its users, they also have generated a nuisance in the form of undesired electronic messages.

For example, in electronic mail messaging (email), it is common to receive a relatively high volume of unsolicited and often undesired messages including predominantly publicity and swindle attempts, commonly known under the name of "SPAM", and malicious programs, such as viruses and worms, for example.

While it may look like a minor nuisance, SPAM is in fact a major problem. Often, SPAM messages received by a user outnumber legitimate messages. Accordingly, there is a need to spend resources for storing, transmitting and filtering these messages.

Many methods have been proposed to alleviate this problem. Unfortunately, they mostly have proven to be unsatisfactory.

For example, one such method uses rules for filtering incoming mail messages. These rules typically label an incoming electronic mail message as being either a legitimate message or a SPAM message. SPAM messages are automatically deleted or stored separately from legitimate messages. Legitimate messages are stored in an incoming email box and readily accessible by the user.

Unfortunately, none of the proposed method is able to automatically identify correctly all SPAM messages as such and all legitimate messages as such. Since classifying a legitimate message as SPAM usually has much worse consequences than classifying a SPAM message as legitimate, these rules typically leave at least a few SPAM messages to be delivered to the incoming email box of the user.

In addition, those who send SPAM, the SPAMMERs, typically monitor and analyze the software used to implement the rules to write and send the SPAM such that it is classified as legitimate.

Another method for reducing SPAM includes only publicizing one's email address to certain other email users from whom emails are desired. Unfortunately, using this method prevents email users other that the certain other email users to send email messages that are properly delivered. Accordingly, this method is of limited use for many businesses and is at most useful in very specific settings. Also, if for any reason the secret email address becomes known to a SPAMMER or to a party that provides email addresses to SPAMMERS, the address becomes useless as a secret address and must be discarded.

In a related method, an identifier is associated with the address. The identifier is distributed only to trusted parties from which the reception of email messages is desired. The identifier in included in email messages sent by these parties. Only email messages including the identifier are delivered to the user's incoming email box. If for any reason the identifier becomes compromised, the user typically modifies the identifier and sends the new identifier to the trusted parties. However, as in the "secret email address" method, unknown parties that are potential trusted parties cannot send email messages that are properly received by the user. Also, if a user wishes to use commercial systems for ordering though email or mailing lists, for example, the identifier needs to be publicized and is likely to find its way to SPAMMERS.

In another method, there is no identifier and the user maintains a list of trusted parties, either manually or with the help of software-implemented heuristics. Incoming email messages are delivered only if they come from a trusted party. Once more, unknown parties that are potential trusted parties cannot send email messages that are properly received by the user.

To try to circumvent this problem, an additional step is performed. Instead of automatically discarding messages coming from unknown parties, a reply message is sent in response to the incoming message, the reply message including a challenge that is designed to be relatively easily answered by a person and relatively hardly answered by a machine. The incoming email message is delivered to the user's inbox only if a satisfactory response to the challenge arrives within a predetermined time interval. This method is based on the fact that SPAMMERs typically forge a reply address. Accordingly, a SPAM message will never receive a reply to the challenge. Also, even if the reply address is legitimate, it would typically be economically unfeasible to have a person replying to all challenge messages as response rates to SPAM are typically very small.

A disadvantage with this method occurs when two users, say A and B each use an email system that implements the challenge method. In this case, if for example A writes and email to B, and A is not a trusted party for B, B will reply with a challenge. However, because B may not be a trusted party for A, A will also reply with a challenge to the challenge. This creates an endless loop wherein A and B will never exchange content through email.

Accordingly, there exists a need for new and improved methods and devices for filtering electronic messages.

OBJECTS OF THE INVENTION

An object of the present invention is therefore to provide an improved method and device for filtering electronic messages.

SUMMARY OF THE INVENTION

In a first broad aspect, the invention provides a method for filtering an incoming electronic message sent by a sender and addressed to an intended user. The method includes providing a first temporary identifier, receiving the incoming electronic message from the sender, processing the incoming electronic message to detect the presence of the first temporary identifier therein, and upon detection of the first temporary identifier, allowing a delivery of the incoming electronic message to the user.

Electronic messages are any types of digital messages that are distributed to receivers identified by an address. They include electronic mail messages, transmitted through the Internet, airwaves or any other suitable medium. However, they also include other types of messages, such as for example and non-limitatively instant messaging messages transmitted through the internet or through a cellular phone network, audio messages (including telephone calls), facsimile messages, video messages and Internet Relay Chat (IRC) messages.

A temporary identifier is an identifier, for example a string of characters, an image, or any other suitable identifier, that is provided by the user or by a machine used by the user for the purpose of performing the above-described method. The identifier is temporary because it is detectable only for a limited amount of time. After this amount of time, the identifier is no longer recognized as a temporary identifier by the method and any message including the invalid temporary identifier is not allowed to be delivered to the user.

Advantageously, the inclusion of a temporary identifier in an outgoing electronic message allows to protect the user's address while allowing to receive replies to outgoing messages. Since the temporary identifier is changed relatively frequently, it is of very limited use to SPAMMERS and other parties wishing to send undesired messages to the user.

In addition, the method is relatively simple and therefore relatively easy to implement.

In a variant, the electronic message is an electronic mail message and the identifier is included in a field of a header or the message that is typically transmitted when sending or replying to a message. Accordingly, a receiver receiving a message including the first temporary identifier from the user and replying to the message relatively fast, while the temporary identifier is detectable, will see the reply accepted for delivery to the user as the first temporary identifier is present in the reply.

This variant is particularly advantageous as it allows to implement the method without requiring that a particular new standard be accepted. Indeed, the currently accepted electronic mail infrastructure is already configured with little or no change to allow the use of the method in this variant.

In a further variant, the identifier is included in a dedicated field in the electronic mail message, for example in a dedicated field in the header of the electronic mail message.

In another broad aspect, the invention provides a method for filtering an electronic mail message sent by a sender and addressed to an intended user. The method includes providing a first temporary identifier and a predetermined identifier, receiving an incoming electronic mail message from the sender, processing the incoming electronic mail message to detect the presence of at least one of the first temporary identifier and predetermined identifier therein, upon detection of the at least one of the first temporary identifier and predetermined identifier, allowing a delivery of the incoming electronic mail message to the user, upon an absence of the first temporary identifier and of the predetermined identifier in the incoming electronic mail message, storing the incoming electronic mail message and sending a challenge message associated with the stored electronic message to the sender, wherein the challenge message is designed to be answered by a person and not a machine, the challenge message including a challenge.

In yet another broad aspect, the invention provides a machine readable storage medium containing a program element for execution by a computing device. The program element is for filtering an incoming electronic message sent by a sender and addressed to an intended user. The program element includes an identifier generating module for providing a first temporary identifier, an input module for receiving the incoming electronic message from the sender, and a filtering module operative for (i) processing the incoming electronic message to detect the presence of the first temporary identifier therein; and (ii) upon detection of the first temporary identifier, allowing a delivery of the incoming electronic message to the user.

In yet another broad aspect, the invention provides a system for filtering an incoming electronic mail message sent by a sender and addressed to an intended user. The system includes an identifier generating means for providing a first temporary identifier, an input means for receiving the incoming electronic mail message from the sender and a filtering means for processing the incoming electronic mail message to detect the presence of the first temporary identifier therein and for, upon detection of the first temporary identifier, allowing a delivery of the incoming electronic mail message to the user.

Other objects, advantages and features of the present invention will become more apparent upon reading of the following non-restrictive description of preferred embodiments thereof, given by way of example only with reference to the accompanying drawings.

DETAILED DESCRIPTION

Figure 1:
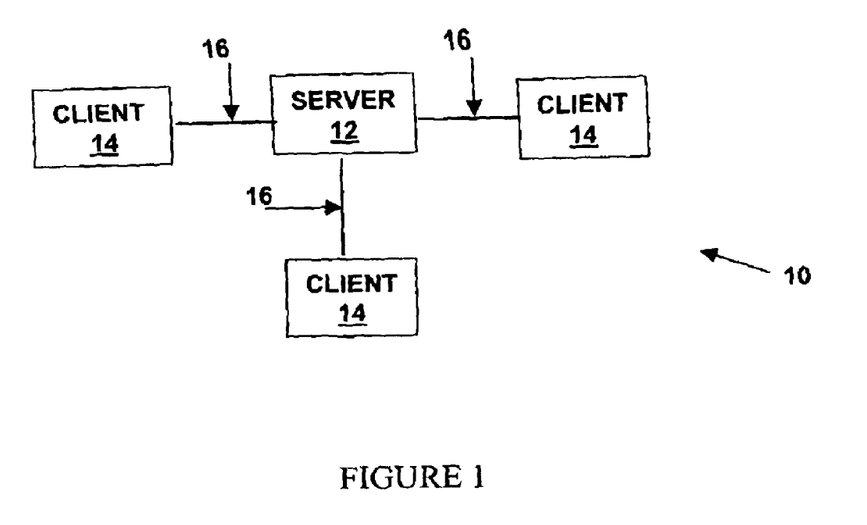
FIG. 1 is a schematic diagram of a system for filtering electronic messages.

Referring to FIG. 1, there is shown in block diagram form a system 10 for filtering an incoming electronic message sent by a sender and addressed to an intended user. In the system 10, the electronic message is an electronic mail messages. However, it is within the scope of the invention to filter other types of electronic messages, such as, for example, instant messaging messages transmitted through the internet or through a cellular phone network, audio messages (including telephone calls), facsimile messages, video messages and Internet Relay Chat (IRC) messages. Accordingly, while this document mainly gives specific examples wherein the electronic messages are electronic mail messages, it is within the scope of the invention to have systems that filter any other suitable type of electronic messages and the description given hereinbelow should not restrict the scope of the appended claims to filtering of currently known electronic mail messages.

The system 10 includes a server 12 and one or more clients 14. In the drawings, three clients 14 are shown. However, it is within the scope of the invention to have a system with any number of clients 14. The server 12 and the clients 14 are connected through links 16. The links 16 allow the clients 14 and the server 12 to exchange electronic messages. In some embodiments of the invention, the links 16 are physical links, such as for example metal wires or optical fibers. In other embodiments of the invention, the links 16 are electromagnetic wave links, such as for example infrared links or radio frequency links. In yet other embodiments of the invention, the links 16 include any other suitable type of link.

Figure 3:
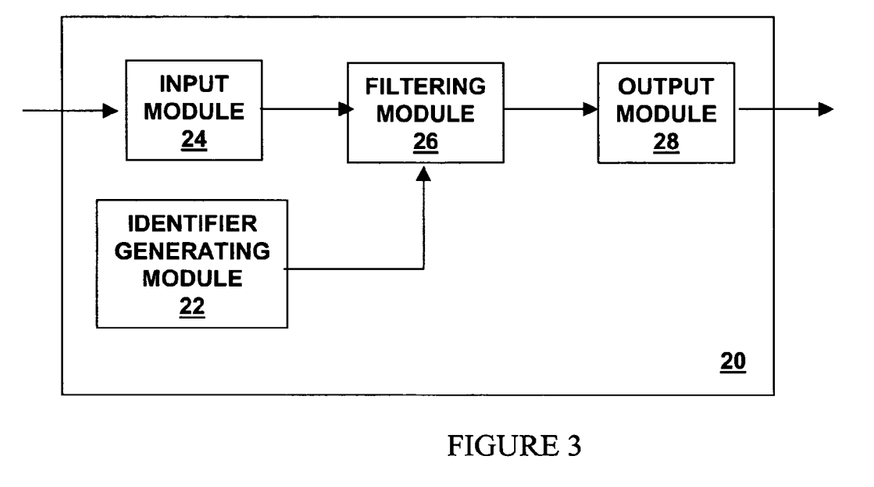
FIG. 3 is a schematic diagram of a program element implementing a method for filtering electronic messages.

In some embodiments of the invention, the system 10 includes a machine readable storage medium containing a program element 20, illustrated in FIG. 3, for execution by a computing device. In a specific embodiment of the invention illustrated in the drawings, the computing device is the server 12. In alternative embodiments of the invention, the computing device is one of the clients 14 or any other suitable computing device.

Figure 2:
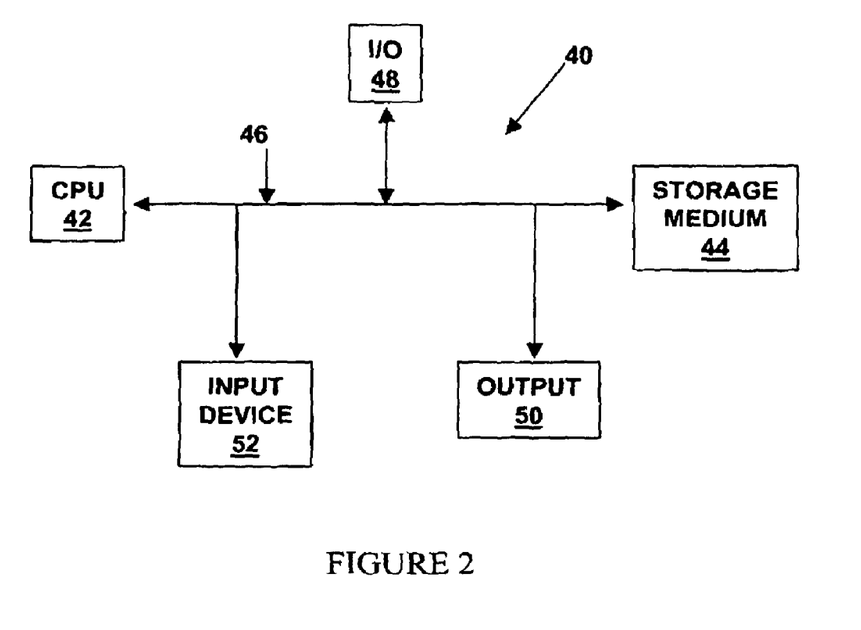
FIG. 2 is a schematic diagram of a computing device for executing a program element implementing a method for filtering electronic messages.

An example of a computing device 40 suitable for executing the program element 20 is illustrated in FIG. 2. However, any other type of suitable computing device is within the scope of the invention. The computing device 40 includes a Central Processing Unit (CPU) 42 connected to a storage medium 44 over a data bus 46. Although the storage medium 44 is shown as a single block, it may include a plurality of separate components, such as a floppy disk drive, a fixed disk, a tape drive and a Random Access Memory (RAM), among others. The computing device 40 also includes an Input/Output (I/O) interface 48 that connects to the data bus 46. The computing device 40 communicates with outside entities through the I/O interface 48. In a non-limiting example of implementation, the I/O interface 48 includes a network interface connected to one of the links 16.

The computing device 40 also includes an output device 50 to communicate information to a human. In the example shown, the output device 50 includes a display. Optionally, the output device 50 includes a printer or a loudspeaker. The computing device 40 further includes an input device 52 through which the user may input data or control the operation of a program element executed by the CPU 42. The input device 52 may include, for example, any one or a combination of the following: keyboard, pointing device, touch sensitive surface or speech recognition unit.

When the computing device 40 is in use, the storage medium 44 holds a program element 20 (see FIG. 3) executed by the CPU 42, the program element 20 implementing a method for filtering the electronic message sent by the sender and addressed to the user.

The program element 20 is for filtering the incoming electronic message sent by the sender and addressed to the user. The program element 20 includes an identifier generating module 22 for providing a first temporary identifier, an input module 24 for receiving the electronic message from the sender and a filtering module 26 operative for (i) processing the incoming electronic message to detect the presence of the first temporary identifier therein; and (ii) upon detection of the first temporary identifier, allowing a delivery of the incoming electronic message to the user. The filtering module 26 receives the incoming electronic message from the input module 24 and the first temporary identifier from the identifier generating module 22.

In some embodiments of the invention, the program element 20 includes an output module 28 for delivering electronic messages to an electronic message interface. The output module 28 receives electronic messages from the filtering module 26.

The user interacts with one of the clients 14. To that effect, this client 14 is for executing an electronic message interface, such as for example an electronic mail interface. A specific and non-limitative type of electronic mail interface is an electronic mail reader program. In this case, a suitable client 14 is a computing device similar to the computing device 40. Accordingly, the client 14 includes, for example, an output for displaying electronic mail messages to the user and an I/O port for receiving and releasing electronic mail messages. Therefore, the output module 28 delivers electronic messages to the electronic message interface through the I/O port of the client 14.

Although in one aspect the present invention is related to a client-server system wherein a filtering functionality is provided on a server, it is also within the scope of the invention to have systems wherein the computing device that executes the program element 20 is a client 14. Also, in other embodiment of the invention, a peer-to-peer system is used wherein there is no server 12. In yet other embodiments of the invention, the program element is executed by a computing device that is included in any other suitable type of system.

Also, the program element 20 is either a stand-alone program element, a plug-in program element, a sub-routine included in a program element or a portion of an operating system for the computing device 40, among others. Accordingly, the program element 20 takes many different forms in alternative embodiments of the invention.

In addition, while specific modules have been identified as being included in the program element 20, the reader skilled in the art will readily appreciate that such modules do not necessarily correspond to distinct instruction sets in the program element 20. More specifically, the above-describes structure should not be interpreted as restricting in any manner the internal structure of the program element 20. Accordingly, the program element 20 is not necessarily programmed using a structured programming language wherein each module corresponds to a specific procedure or sub-routine.

Figure 4:
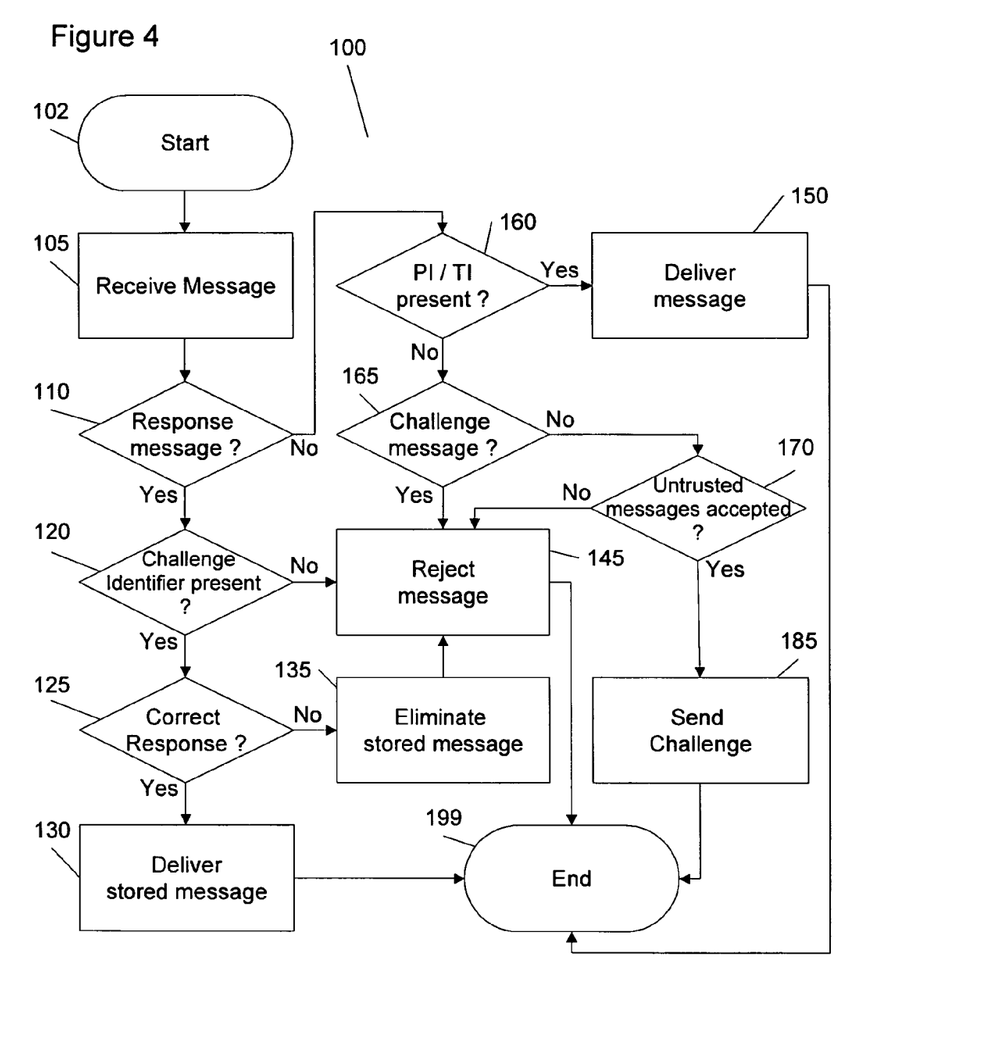
FIG. 4 is a flowchart of a method for filtering electronic messages.

The system 10 implements a method 100, illustrated in flowchart form in FIG. 4, for filtering an incoming electronic message sent by a sender and addressed to an intended user. Briefly, the method includes the steps of:
 a. providing a first temporary identifier;
 b. receiving an incoming electronic message from the sender;
 c. processing the incoming electronic message to detect the presence of the first temporary identifier therein; and
 d. upon detection of the first temporary identifier, allowing a delivery of the incoming electronic message to the user.

In an alternative aspect, the system 10 implements a method for filtering an incoming electronic mail message sent by a sender and addressed to a user, the method including:
 a. providing a first temporary identifier and a predetermined identifier;
 b. receiving an incoming electronic message from the sender;
 c. processing the incoming electronic message to detect the presence of at least one of the first temporary identifier and predetermined identifier therein;
 d. upon detection of the of at least one of the first temporary identifier and predetermined identifier, allowing a delivery of the incoming electronic mail message to the user;
 e. upon an absence of the first temporary identifier and of the predetermined identifier in the electronic mail message, storing the incoming electronic mail message and sending a challenge message associated with the stored electronic message to the sender, wherein the challenge message is designed to be answered by a person and not a machine, the challenge message including a challenge.

In yet another aspect, the invention relates to a system for filtering an incoming electronic mail message sent by a sender and addressed to an intended user. The system includes an identifier generating means for providing a first temporary identifier, an input means for receiving the incoming electronic mail message from the sender and a filtering means for processing the incoming electronic mail message to detect the presence of the first temporary identifier therein and for, upon detection of the first temporary identifier, allowing a delivery of the incoming electronic mail message to the user.

FIG. 4 illustrates an example of the method 100 for filtering electronic messages in accordance with the invention. The reader skilled in the art will appreciate that many other alternative methods are within the scope of the invention, some of which are variants of the method 100.

In the following text, the epithet electronic relating to messages is omitted to improve readability. However, it should be understood that unless otherwise specified, all messages referred-to hereinbelow are electronic messages.

The method starts at step 102. At step 105, an incoming message is received from a sender by the input module 24. At step 110, the filtering module 26 verifies if the incoming message is a response message sent in response to a challenge message. Briefly, challenge messages are messages that are sent upon the reception of a message from an untrusted party, which is a party that is not authorized yet to send messages to the user, to verify that the untrusted party is a human and not an automated mailing list system. A challenge message is associated with a stored message that is delivered to the user upon a correct response to the challenge. The emission and content of challenge messages are described in further details hereinbelow.

If the incoming message is a response message, the filtering module 26 verifies at step 120 if a challenge identifier is present in the response message, the challenge identifier being associated with a previously sent challenge message. If the challenge identifier is not present, the filtering module 26 jumps to step 145 and rejects the response message, further to which the method 100 ends at step 199.

If the challenge identifier is present, the filtering module 26 jumps to step 125 and verifies that the response message includes a correct response to the challenge. If the response message includes a correct response to the challenge, the electronic message associated with the challenge message to which the response message relates is allowed to be delivered to the user's electronic message interface at step 130 and the method ends at step 199. Actual delivery is performed by the output module 28.

If the response message includes an incorrect response to the challenge, the stored message associated with the challenge message to which the response message relates is eliminated at step 135 and the incoming message is rejected at step 145. Then, the method ends at step 199.

Returning to step 110, if the incoming message is not a response message, the method jumps at step 160 wherein the filtering module verifies if either of a temporary identifier or a predetermined identifier is present in the incoming message. If either of the predetermined or temporary identifiers is present, the method jumps to step 150 wherein the electronic message is allowed to be delivered to the user and the method ends at step 199. Otherwise, the method jumps to step 165.

At step 165, the filtering module 26 verifies if the incoming message is a challenge message from another party. In the affirmative, the method jumps to step 145 wherein the incoming message is rejected and the method ends at step 199. Otherwise, the method jumps to step 170.

At step 170, the filtering module 26 verifies if messages from untrusted parties are to be eventually delivered to the user further to a correct response to a challenge. If not, the method jumps to step 145 wherein the incoming message is deleted. Otherwise, the method jumps to step 185 wherein the filtering module 26 stores the incoming message in the storage medium 44 and sends a challenge message to the untrusted party through the I/O port 28. In some embodiments of the invention, the filtering module 26 searches at step 185 for a temporary identifier from the untrusted party in the incoming message and ensures that the temporary identifier from the untrusted party is included in the challenge message. Then, processing of the incoming message is completed and the method ends at step 199.

To better understand the above-described method 100, an example of a context wherein the method 100 is usable is described hereinbelow. The predetermined identifier and the temporary identifier are identifiers that are included in at least some electronic messages sent by the user.

The predetermined identifier is typically provided by the user and publicized only to trusted parties from which the user wishes to receive electronic messages. For example, the predetermined identifier is received from the user through prompting the user upon a first use of the system 10 by the user. In some embodiments of the invention, a plurality of predetermined identifiers are used, each predetermined identifier being associated with one or more senders. In this case, a predetermined identifier is valid only when present in an electronic message sent by its associated sender(s).

Also, in some embodiments of the invention, the predetermined identifier is modifiable by the user through the electronic message interface. In this case, some embodiments of the invention allow for automatically sending an identifier update message to each destination present in the predetermined list of destinations further to an instruction from the user to change the predetermined identifier to new predetermined identifier, the identifier update message including the new predetermined identifier. This action allows to update the predetermined identifier to a new identifier and to automatically send the new identifier to other parties for which the destination is present in the predetermined list of destinations, for example to parties for which an electronic mail address is present in a contacts list.

In a non-exclusive manner of publicizing the predetermined identifier, the predetermined identifier is included in an electronic message sent by the user to a trusted party. In another non-exclusive manner of publicizing the predetermined identifier, the predetermined identifier is communicated to the trusted party through a non-electronic message, such as for example through a business card including the predetermined identifier or through a telephone conversation. In other non-exclusive manners of publicizing the predetermined identifier, the predetermined identifier is publicized through a Web site in a text format or through an image, a script, an audio signal or a video signal, among others. Then, if the trusted party includes the predetermined identifier in electronic messages sent to the user in a suitable manner, the method 100 will detect the predetermined identifier and allow delivery of these electronic messages.

In some embodiments of the invention, the electronic message interface includes the predetermined identifier in outgoing messages sent by the user that satisfy at least one predetermined diffusion criteria. An example of such a diffusion criteria is "sending the outgoing message to a destination present in a predetermined list of destinations", which is non-limitatively a contacts list, such as a contact list managed by the electronic message interface or a remotely stored contact list. Lists of destinations and contact lists are well-known in the art and will not be described in further details.

Another example of a diffusion criteria includes a reception of an inclusion command from the user, given for example through selection of an appropriate input field in the electronic message interface. Any other suitable diffusion criteria is also within the scope of the invention.

The temporary identifier is generated by the identifier generating module 22 and is modified relatively frequently. Further to their generation, temporary identifiers are stored for use by the method 100 only over a relatively short time interval in the storage medium 44. Therefore, the method 100 only allows delivery of messages including recently generated temporary identifiers. For example, the method 100 only accepts the last generated temporary identifier and the second-to-last generated temporary identifier.

In some embodiments of the invention, the temporary identifier is automatically updated at random time intervals. In other embodiments of the invention, the temporary identifier is automatically updated at a fixed time interval. Examples of a fixed time interval include one hour, one day or one week, among others. In yet other embodiments of the invention, the system 10 prompts the user at random or predetermined time intervals for new temporary identifiers to use and uses for a new temporary identifier the identifier thereby provided.

In some embodiments of the invention, the temporary identifier is included in an outgoing message only if the predetermined identifier is excluded from the outgoing message. In other embodiments of the invention, the temporary identifier is included in every outgoing message sent by the user.

In some embodiments of the invention, the temporary identifier includes a string of characters or at least one symbol, which can be a video or sound information, that is used explicitly for the purpose of being the temporary identifier. In other embodiments of the invention the temporary identifier is indicative of a moment at which an electronic message was sent, a destination to which an electronic message was sent, of a content of an electronic message that was sent, or of any combination thereof. In the case of an electronic mail message, a combination of a destination electronic mail address, a subject of the electronic mail message and a time at which the electronic mail message was sent is therefore an example of a suitable temporary identifier.

In a specific example of implementation, the electronic message is an electronic mail message. Typically, such messages include a header containing information about the source and the destination of the message, among others. Also, these messages include a body including information to be transmitted through the message.

The source and destination information typically each include an address identifying respectively the sender and the receiver of the message and are present respectively in source and destination fields in the message. An example of a source field includes a "from" field while examples of destination fields include "to", "CC" and "BCC" fields (CC: Carbon Copy, BCC: Blind Carbon Copy). In addition, the source and destination information typically each include an alias related respectively the sender and the receiver of the message. An example of such an alias is a string of characters spelling a name of the sender or of the receiver.

In this context, it is advantageous in some embodiments of the invention to include an identifier, such as a predetermined or a temporary identifier, in an alias. For example, the identifier is appended to the alias related to the name of the sender when sending an outgoing message. Therefore, if a receiver replies to the message before the temporary identifier is deleted from the sender's system, the sender will very likely receive the temporary identifier in the reply message as typically electronic mail interfaces include the alias information as well as the address information for the sender in a reply to a message.

Therefore, the sender is able to receive replies to the outgoing message without publicizing his predetermined identifier. Accordingly, this reply is only delivered to the sender for a certain time interval. If the reply is sent after this time interval, the reply is rejected.

This behavior is useful in many contexts. For example, and non-limitatively, a user buying an item from a supplier through electronic mail is able to receive, still trough electronic mail, a confirmation that an order is placed, as these confirmations are typically sent very shortly after the reception of the order. However, contrary to what would happen if the predetermined identifier were to be included in such an order, the supplier cannot use the temporary identifier to SPAM the sender as the temporary identifier becomes invalid after a relatively short time interval.

In other embodiments of the invention, the identifier is included in a dedicated field in the electronic mail message, for example in a dedicated field in the header of the electronic mail message.

In another non-limitative context, if the sender, who receives electronic mail messages through the system 10, sends an outgoing message to a receiver who receives electronic mail messages through a system similar to the system 10 and includes the sender's temporary identifier in the outgoing message, the system of the receiver will be able to send a challenge message that will be delivered to the sender if the challenge message includes the sender's temporary identifier. Otherwise, the challenge message would not be delivered and communication would at best stop of at worst create an endless loop of challenge messages being sent in response to challenge messages.

A challenge message is a message that is designed to be answered by a person and not a machine, the challenge message including a challenge. Such challenge messages are well-known in the art. For example, the challenge includes an image of a word written with letters that are crossed or otherwise altered. In addition the challenge message includes instructions on the way to respond to the challenge. A human easily recognizes the word and follow the instructions to retype the word at an appropriate location in a response message. Upon reception of the response message by the system 10, the detection of the response in the response message is relatively easy to perform automatically. Such challenges are typically very difficult to respond to correctly by machines. There exist many other types of suitable challenge messages that are usable in conjunction with the invention.

In some embodiments of the invention, challenge messages are used to delude spammers. An example of such a delusion occurs if, the incoming message is rejected according to criteria that differ from the presence or the absence of identifiers such as those described hereinabove. Such criteria for filtering incoming messages are well-known in the art. However, a challenge message is nevertheless sent but includes an invalid challenge identifier. Accordingly, if the spammer responds to the challenge message, the challenge message is deleted, even if the response is correct. This delusion attempts at increasing the cost of sending spam for the spammer such as to make spamming less attractive.

In view of the above definitions and precisions, some of the steps in the method 100 are commented and expanded upon herein below.

At step 110, the filtering module 26 verifies if the incoming message is a response message sent in response to a challenge message. In some embodiments of the invention, this verification is performed through the detection of a second temporary identifier. Such second temporary identifiers are included in challenge messages sent at step 185.

In other embodiments of the invention, this verification is performed through the detection of a suitable portion of the incoming message that matches any suitable manner of identifying a challenge message. For example, such a suitable portion is a subject field in a header of an electronic mail message including a challenge-specific string that identifies messages as challenge responses.

At step 120, the filtering module 26 verifies if a challenge identifier is present in the response message, the challenge identifier being associated with a previously sent challenge message. The challenge identifier includes a key that associates the challenge response to a previously sent challenge message. The challenge identifier is either directly associated with the previously sent challenge message or indirectly associated with a stored message that itself is associated with the previously sent challenge message.

Indeed, to be of any use, the challenge message must typically include a challenge that is not constantly the same. To be able to verify that a correct response to the challenge is included in the response message, the challenge identifier is included in the sent challenge message. Advantageously, this allows to retrieve the correct challenge response associated with a specific challenge message without including the challenge response in the challenge message. Accordingly, a challenge identifier is associated with each challenge and each stored message. The correct response to the challenge is detected in the response message at step 125 by looking for the challenge response associated with the challenge identifier present in the response message. Methods and data structure for associating messages, challenge responses and challenge identifiers are well-known in the art and will not be further detailed herein.

If there is an incorrect response to the challenge is the response message, at step 135 the stored message is eliminated and the incoming message is rejected. In some embodiments of the invention, an absence of a response is an incorrect response. However, there may be more than one correct response to a challenge. For example, if the response is the number 4, the following strings may be acceptable responses: "4", "four", "Four" and "FOUR", among others.

In some embodiments of the invention, the challenge includes a question that only persons familiar with the user would know the answer to.

At step 135, and at step 145, eliminating a stored message and rejecting an incoming message include any suitable manner of processing these messages. For example, they include deleting permanently the message from the system 10, moving the message to a specific location in the system 10 for further use by an administrator of the system 10, including a mention of the elimination and/or rejection in a log file, or any other suitable action. These actions are well-known in the art and will not be described in further details.

At step 160, the presence of the predetermined or of the temporary identifier is detected. However, the presence of the predetermined identifier is only an example of a predetermined input filtering criteria. Upon satisfaction of the predetermined input filtering criteria, at step 150 the incoming message is allowed to be delivered to the user. Another example of such a criteria is the detection of a sender for the message that is included in the predetermined list of destinations.

At step 185, when the incoming message is not a response message and does not include the primary or the temporary identifier, a challenge message is sent. The incoming message is stored, and therefore becomes a stored message. The stored message will be delivered to the user upon a reception of a correct response to the challenge included in the challenge message. A key associated with the challenge, in the form of a challenge identifier, is sent along with the challenge in the challenge message. Accordingly, a challenge, a stored message and a key are associated together.

In some embodiment of the invention, a second temporary identifier is included in the challenge message and a response message including the second temporary identifier is accepted at steps 110 or 120 only if the second temporary identifier is still present in the system 10. In other words, since temporary identifiers are only valid for a limited amount of time, the response message is only accepted for this limited amount of time. In this case, in some embodiments of the invention, the response message is identified as being a response message through the presence of the second temporary identifier in the response message at step 110.

In alternative embodiments of the invention, the response message is identified through the presence of a generic challenge identifier in the response message, which is a fixed identifier.

In other embodiments of the invention, the challenge message includes the first temporary identifier. Accordingly, there is no need in theses embodiments to generate temporary identifiers for the sole purpose of sending and receiving challenge messages and the response thereof.

Optionally, in some embodiments of the invention, step 130 of allowing a delivery of the stored message also includes adding the sender of the response message to the predetermined list of destinations if the response message includes a correct response to the challenge.

In some embodiments of the invention, the presence of a permanent identifier unalterable by the user is also sufficient to allow delivery of the message at step 160. For example, the permanent identifier is provided by a distributor or retailer of the program element 20. The permanent identifier provides a "back door" that is usable by a privileged party to send targeted information. Examples of use of the "back door" are the issuance of advertisements to the user and the issuance of messages including information relevant to the program element 20, such as examples regarding tips for using the program element 20 or information regarding new releases of the program element 20. The permanent identifier need not be totally permanent and in some embodiments of the invention some parties, for example the privileged party, can modify if desired the permanent identifier through a suitable message sent to the program element 20.

In some embodiments of the invention, the permanent identifier is removed from the message before being delivered, such as to prevent the user from filtering out messages including the permanent identifier. In other embodiments of the invention, the permanent identifier is modifiable by an authorized party, for example by the distributor or retailer of the program element 20.

In some embodiments of the invention, the program element 20 is a self-promoting program that adds in outgoing messages a promotional message regarding the program element 20. In other embodiments of the invention, the program element 20 is a self-distributing program that distributes a copy of itself, for example through an attachment to an electronic mail message, upon a request sent in response to the promotional message. Methods and devices to implement such self-promoting and self-distributing messages are well-known in the art and will therefore not be described in further details herein.

Although some specific functions of the program element 20 are presented hereinabove, this description should not be interpreted as being limitative and the program element 20 includes other functionalities in other embodiments of the invention.

Although the present invention has been described hereinabove by way of preferred embodiments thereof, it can be modified, without departing from the spirit and nature of the subject invention as defined in the appended claims.

What is claimed is:

1. A method for filtering an incoming electronic message sent by a sender and addressed to an intended user, the method comprising:

providing, by the intended user, a predetermined identifier to the sender, the predetermined identifier being associated with the sender;

providing, by a system, a temporary identifier, wherein the temporary identifier is included in an outgoing electronic message sent by the intended user to the sender, said temporary identifier identifying at least one of a moment at which the outgoing electronic message was sent, a destination to which the outgoing electronic message was sent, and a content of the outgoing electronic message, wherein said temporary identifier is appended to an alias related to a name of the intended user and included in a source header of the outgoing electronic message in a way that does not modify an actual electronic address of the intended user included in the same source header;

receiving, by the system, the incoming electronic message from the sender;

processing, by the system, the incoming electronic message to determine whether the incoming electronic message is a response message sent in response to a challenge message, and upon determining that the incoming electronic message is not a response message sent in response to a challenge message, detect a presence of the temporary identifier or the predetermined identifier in the alias related to the name of the intended user in a destination header of the incoming electronic message, wherein the presence of at least one of the temporary identifier and the predetermined identifier in the alias does not modify an actual electronic address of the intended user included in the same destination header;

upon detection of either one or both of the temporary identifier and the predetermined identifier, allowing a delivery of the incoming electronic message to the intended user, and upon detection of an absence of the temporary identifier and the predetermined identifier in the incoming electronic message:

storing the incoming electronic message, and sending a challenge message including a temporary challenge identifier associated with the stored incoming electronic message to the sender, the challenge message including a challenge designed to be answered by a person and not a machine, wherein determining whether the incoming electronic message is a response message sent in response to a challenge message includes determining whether the incoming electronic message includes a temporary challenge identifier included with a previously sent challenge message.

2. A method as defined in claim 1, wherein the predetermined identifier is included in outgoing electronic messages sent by the intended user that satisfy at least one predetermined diffusion criteria.

3. A method as defined in claim 2, wherein the at least one predetermined diffusion criteria includes presence of a destination address in a predetermined list of destinations.

4. A method as defined in claim 3, wherein the predetermined list of destinations includes a contact list.

5. A method as defined in claim 4, wherein the temporary identifier is included in the outgoing electronic message only if the predetermined identifier is excluded from the outgoing electronic message.

6. A method as defined in claim 3, further comprising the step of automatically sending an identifier update message to each destination address present in the predetermined list of destinations in response to an instruction from the intended user to change the predetermined identifier to a new predetermined identifier, the identifier update message including the new predetermined identifier.

7. A method as defined in claim 1, wherein the predetermined identifier is included in the outgoing electronic message sent by the intended user upon a reception of an inclusion command from the intended user.

8. A method as defined in claim 7, wherein the temporary identifier is included in the outgoing electronic message only if the predetermined identifier is excluded from the outgoing electronic message.

9. A method as defined in claim 1, wherein the temporary identifier is included in every outgoing electronic message sent by the intended user.

10. A method as defined in claim 1, further comprising:
receiving a response message in response to the previously sent challenge message, the response message including the temporary challenge identifier; and
upon the response message including a correct response to the challenge, delivering the stored message to the intended user.

11. A method as defined in claim 10, further comprising the step of eliminating the stored message if the response message includes an incorrect response to the challenge.

12. A method as defined in claim 11, wherein an incorrect response to the challenge includes absence of a response to the challenge.

13. A method as defined in claim 12, further comprising the step of adding the sender to a predetermined list of destinations if the response message includes a correct response to the challenge, wherein outgoing electronic messages sent by the intended user to a destination address included in the predetermined list of destinations all include the predetermined identifier.

14. A method as defined in claim 13, wherein the challenge message and the response message are electronic messages.

15. A method as defined in claim 14, wherein the temporary identifier is automatically updated at random time intervals.

16. A method as defined in claim 14, wherein the temporary identifier is automatically updated at a fixed time interval.

17. A method as defined in claim 14, wherein the temporary challenge identifier is automatically updated at random time intervals.

18. A method as defined in claim 14, wherein the temporary challenge identifier is automatically updated at a fixed time interval.

19. A method as defined in claim 14, further comprising:
providing, by the system, a permanent identifier, the permanent identifier being unalterable by the intended user;
processing, by the system, the incoming electronic message to detect a presence of the permanent identifier therein;
upon detection of the permanent identifier, allowing a delivery of the incoming electronic message to the intended user.

20. A method as defined in claim 1, further comprising the step of providing an electronic message interface to update the predetermined identifier, wherein updating the predetermined identifier is performed automatically in response to a reception from the intended user of an identifier update message by means of the electronic message interface, the identifier update message including a new predetermined identifier.

21. A machine readable non-transitory storage medium containing a program for execution by a computing device, said program configured to filter an incoming electronic message sent by a sender and addressed to an intended user, said program providing a predetermined identifier to the sender, the predetermined identifier being associated with the sender, the program comprising:

an identifier generating module that provides a temporary identifier, wherein the temporary identifier is included in an outgoing electronic message sent by the intended user to the sender, said temporary identifier identifying at least one of a moment at which the outgoing electronic message was sent, a destination to which the outgoing electronic message was sent, and a content of the outgoing electronic message, wherein said temporary identifier is appended to an alias related to a name of the intended user and included in a source header of the outgoing electronic message in a way that does not modify an actual electronic address of the intended user included in the same source header;

an input module that receives the incoming electronic message from the sender; and a filtering module that:
  processes the incoming electronic message to determine whether the incoming electronic message is a response message sent in response to a challenge message, and upon determining that the incoming electronic message is not a response message sent in response to a challenge message, detect a presence of the temporary identifier or the predetermined identifier in the alias related to the name of the intended user in a destination header of the incoming electronic message, wherein the presence of at least one of the temporary identifier and the predetermined identifier in the alias does not modify an actual electronic address of the intended user included in the same destination header;
  upon detection of either one or both of the temporary identifier and the predetermined identifier, allows a delivery of the incoming electronic message to the intended user; and
  upon detection of an absence of the temporary identifier and the predetermined identifier in the incoming electronic message:
    stores the incoming electronic message; and
    sends a challenge message including a temporary challenge identifier associated with the stored incoming electronic message to the sender, the challenge message including a challenge designed to be answered by a person and not a machine, wherein determining whether the incoming electronic message is a response message sent in response to a challenge message includes determining whether the incoming electronic message includes a temporary challenge identifier included with a previously sent challenge message.

22. A machine readable non-transitory storage medium as defined in claim 21, wherein said program further comprises an output module that releases the incoming electronic message for delivery to the intended user.

23. A machine readable non-transitory storage medium as defined in claim 21, wherein the predetermined identifier is included in outgoing electronic messages sent by the intended user that satisfy at least one predetermined diffusion criteria.

24. A machine readable non-transitory storage medium as defined in claim 23, wherein the at least one predetermined diffusion criteria includes presence of a destination address in a predetermined list of destinations.

25. A machine readable non-transitory storage medium as defined in claim 24, wherein the predetermined list of destinations includes a contact list.

26. A machine readable non-transitory storage medium as defined in claim 25, wherein the temporary identifier is included in the outgoing electronic message only if the predetermined identifier is excluded from the outgoing electronic message.

27. A machine readable non-transitory storage medium as defined in claim 21, wherein the temporary identifier is included in every outgoing electronic message sent by the intended user.

28. A machine readable non-transitory storage medium as defined in claim 21, wherein said input module is further configured to receive a response message in response to the previously sent challenge message, the response message including the temporary challenge identifier; and
  said filtering module, upon the response message including a correct response to the challenge, is further configured to allow a delivery of the stored message to the intended user.

29. A machine readable non-transitory storage medium as defined in claim 28, wherein said filtering module is further configured to eliminate the stored message if the response message includes an incorrect response to the challenge.

30. A machine readable non-transitory storage medium as defined in claim 29, wherein the challenge message and the response message are electronic messages.

31. A machine readable non-transitory storage medium as defined in claim 29, wherein said identifier generating module automatically updates the temporary identifier at random time intervals.

32. A machine readable non-transitory storage medium as defined in claim 29, wherein said identifier generating module automatically updates the temporary identifier at a fixed time interval.

33. A machine readable non-transitory storage medium as defined in claim 21, containing a program element providing an electronic message interface to update the predetermined identifier, wherein updating the predetermined identifier is performed automatically in response to a reception from the intended user of an identifier update message by means of the electronic message interface, the identifier update message including a new predetermined identifier.

34. A system for filtering an incoming electronic message sent by a sender and addressed to an intended user,
  said system comprising:
  means for providing a predetermined identifier to the sender, the predetermined identifier being associated with the sender;
  a computer processor; and
  a memory storing an identifier generating module, an input module, and a filtering module, wherein:
    the identifier generating module provides a temporary identifier wherein the temporary identifier is included in an outgoing electronic message sent by the intended user to the sender, said temporary identifier identifying at least one of a moment at which the outgoing electronic message was sent, a destination to which the outgoing electronic message was sent, and a content of the outgoing electronic message, wherein said temporary identifier is appended to an alias related to a name of the intended user and included in a source header of the outgoing electronic message in a way that does not modify an actual electronic address of the intended user included in the same source header;
    the input module receives the incoming electronic message from the sender; and
    the filtering module processes the incoming electronic message to determine whether the incoming electronic message is a response message sent in response to a challenge message, and upon determining that the incoming electronic message is not a response message sent in response to a challenge message, detect a presence of the temporary identifier or the predetermined identifier in the alias related to the name of the intended user in a destination header of the incoming electronic message, wherein the presence of at least one of the temporary identifier and the predetermined identifier in the alias does not modify an actual electronic address of the intended user included in the same destination header;

wherein said system is further configured to:
  upon detection of either one or both of the temporary identifier and the predetermined identifier, allowing a delivery of the incoming electronic message to the intended user, and
  upon detection of an absence of the temporary identifier and the predetermined identifier in the incoming electronic message:
    storing the incoming electronic message; and
    sending a challenge message including a temporary challenge identifier associated with the stored incoming electronic message to the sender, the challenge message including a challenge designed to be answered by a person and not a machine, wherein determining whether the incoming electronic message is a response message sent in response to a challenge message includes determining whether the incoming electronic message includes a temporary challenge identifier included with a previously sent challenge message.

35. A system as defined in claim 34, wherein said identifier generating module, said input module and said filtering module reside on a server.

36. A system as defined in claim 35, further comprising:
an electronic mail interface displaying incoming electronic messages to the intended user and for producing electronic messages from intended user inputs; and
an output module delivering electronic messages to said electronic mail interface.

37. A system as defined in claim 36, wherein:
said output module resides on said server; and
said electronic mail interface resides on a client in electronic messaging communication with said server.

38. A system as defined in claim 37, wherein said electronic mail interface includes the predetermined identifier in outgoing electronic messages produced from the intended user input that satisfy at least one predetermined diffusion criteria.

39. A system as defined in claim 38, wherein the at least one predetermined diffusion criteria includes presence of a destination address in a predetermined list of destinations.

40. A system as defined in claim 39, wherein the predetermined list of destinations includes a contact list.

41. A system as defined in claim 37, wherein the temporary identifier is included in the outgoing electronic message produced from the intended user input only if the predetermined identifier is excluded from the outgoing electronic message.

42. A system as defined in claim 37, wherein the temporary identifier is included in every outgoing electronic messages produced from the intended user input.

43. A system as defined in claim 37, wherein said input means is further configured to receive a response message in response to the challenge message; and
said filtering module, upon the response message including a correct response to the challenge, is further configured to allow delivery of the stored message to the intended user.

44. A system as defined in claim 43, wherein said filtering module is further configured to eliminate the stored message if the response mail message includes an incorrect response to the challenge.

45. A system as defined in claim 37, wherein said electronic mail interface is further configured to add the sender to a predetermined list of destinations if the response message includes a correct response to the challenge, wherein outgoing electronic messages sent by the intended user to a destination address included in the predetermined list of destinations all include the predetermined identifier.

46. A system as defined in claim 45, wherein said identifier generating module automatically updates the temporary identifier at random time intervals.

47. A system as defined in claim 45, wherein said identifier generating module automatically updates the temporary identifier at a fixed time interval.

48. A system as defined in claim 34, providing an electronic message interface configured to automatically update the predetermined identifier, wherein updating is performed in response to a reception from the intended user of an identifier update message, the identifier update message including a new predetermined identifier.

* * * * *